J. B. McKIEL.
CONNECTOR FOR LAMPS.
APPLICATION FILED MAY 18, 1911.
1,024,643.
Patented Apr. 30, 1912.
3 SHEETS—SHEET 1.
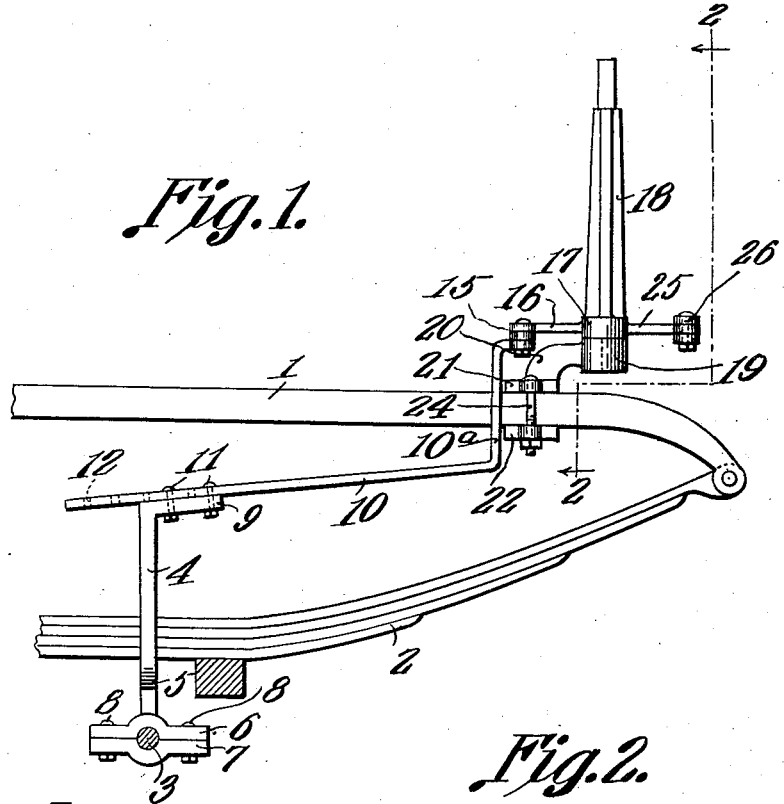
Fig. 1.
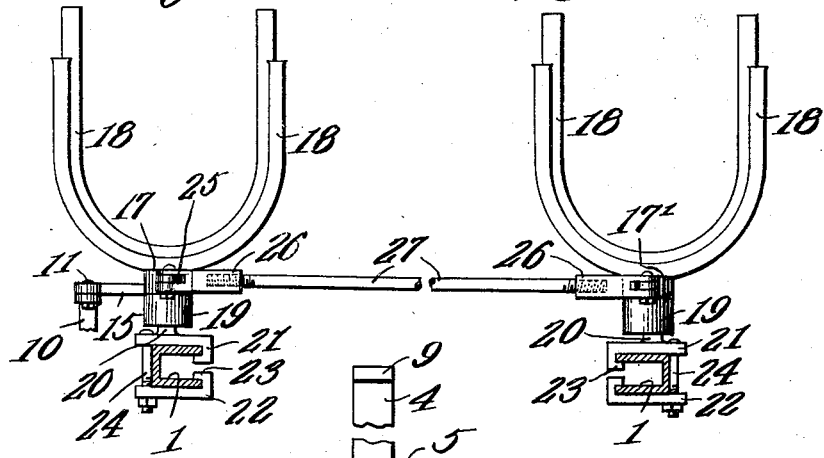
Fig. 2.
Fig. 9.
Witnesses
James B. McKiel,
Inventor
by C. A. Snow & Co.
Attorneys

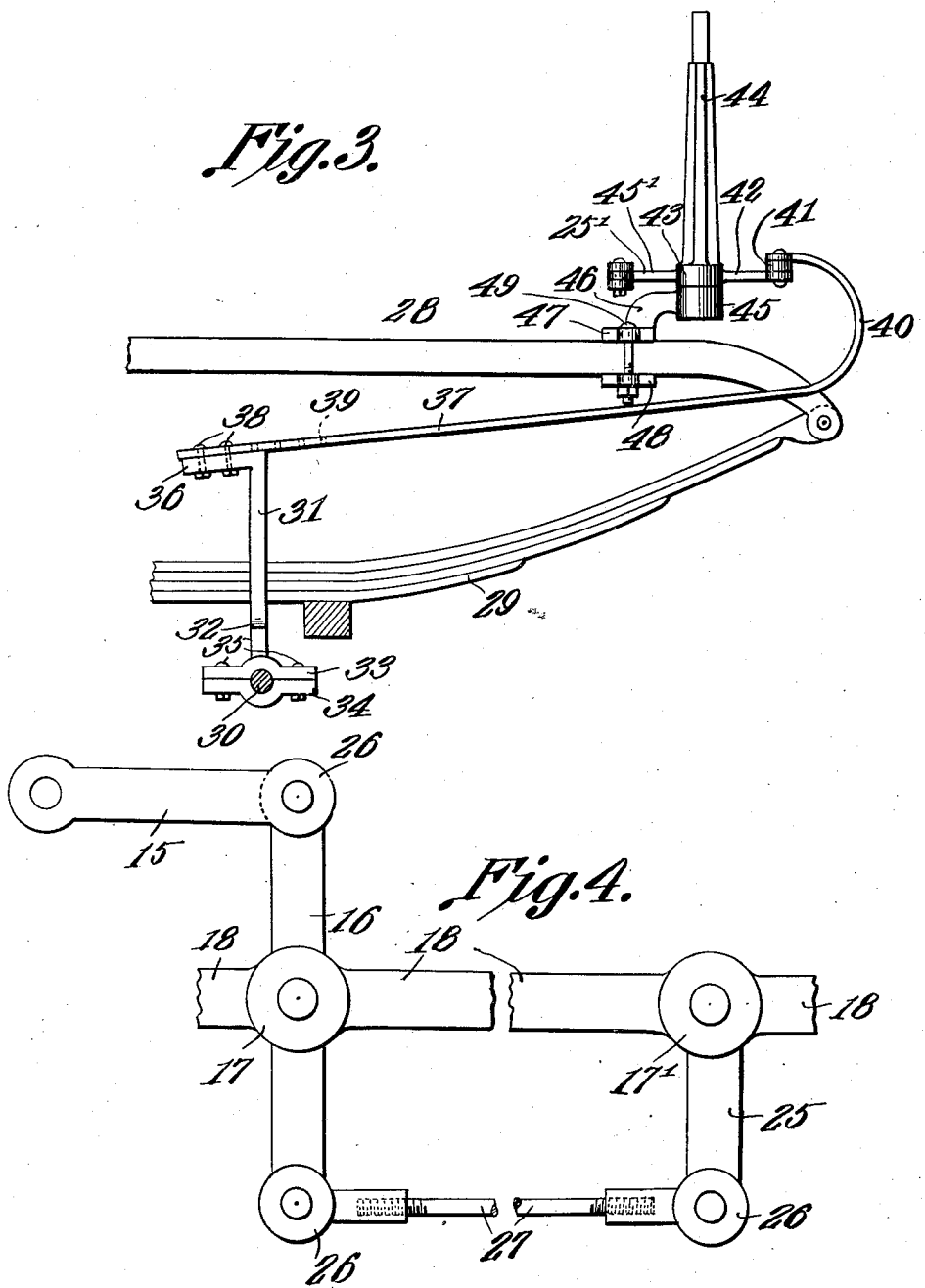

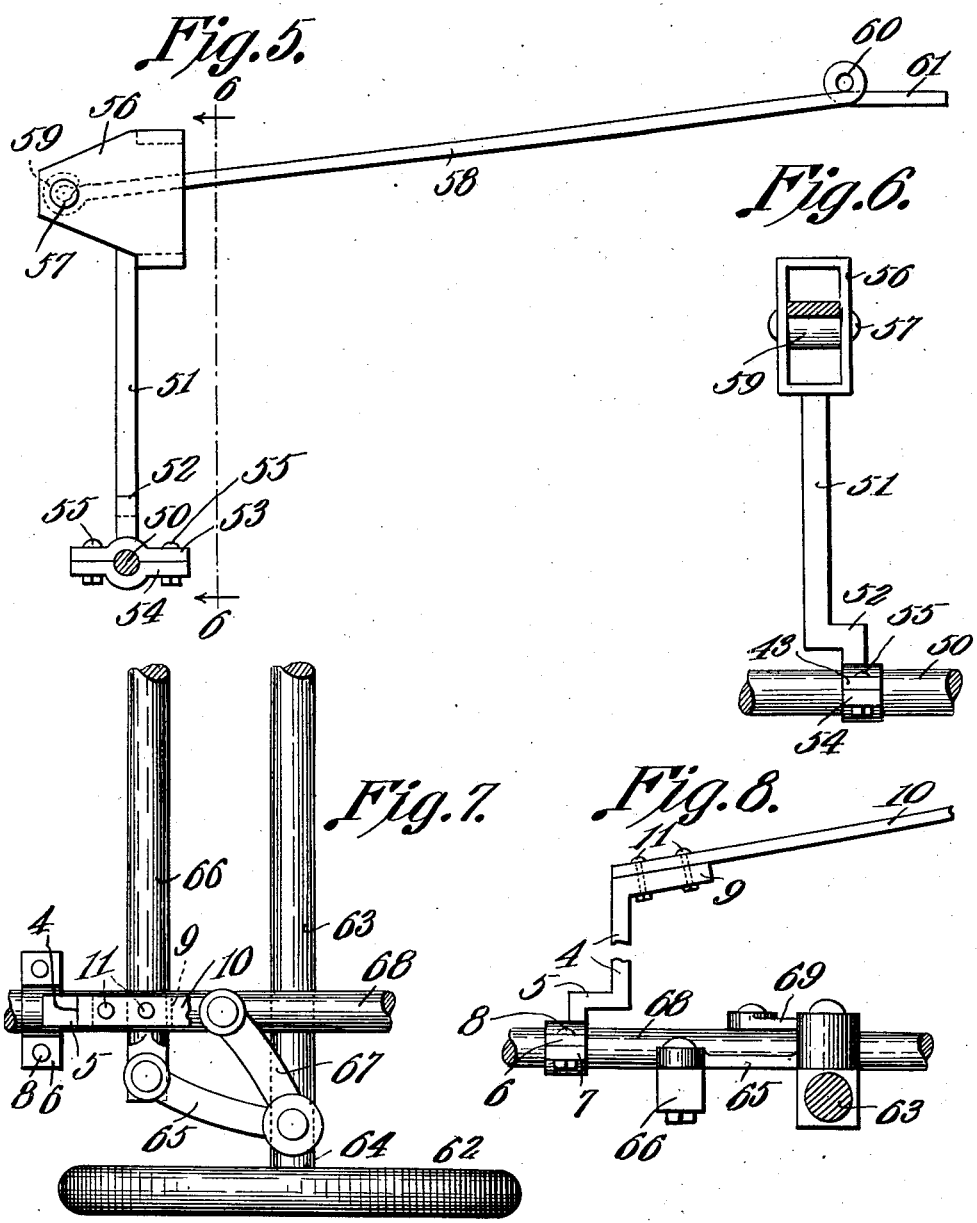

UNITED STATES PATENT OFFICE.

JAMES B. McKIEL, OF MARSHALL, TEXAS.

CONNECTOR FOR LAMPS.

1,024,643. Specification of Letters Patent. Patented Apr. 30, 1912.

Application filed May 18, 1911. Serial No. 627,988.

*To all whom it may concern:*

Be it known that I, JAMES B. McKIEL, a citizen of the United States, residing at Marshall, in the county of Harrison and State of Texas, have invented a new and useful Connector for Lamps, of which the following is a specification.

One object of the present invention is to provide a connection whereby the steering rod of a vehicle may be operatively connected with the lamps thereof, to effect a turning of the lamps, simultaneously with the movement of the steering rod, to effect a change in the direction in which the vehicle is moving.

A further object of the invention is to provide a structure of the class above referred to, which will respond readily to the movement produced by the depression and the raising of the body of the vehicle, as the body of the vehicle moves to and fro upon the spring, over a rough road.

A further object of the invention is to provide novel means whereby the lamps upon both sides of the vehicle, may be controlled by a mechanism located upon one side only of the vehicle, and connected with the steering rod or other appropriate portion of the mechanism.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the drawings,—Figure 1 shows one form of the invention in side elevation; Fig. 2 is a transverse section on the line 2—2 of Fig. 1; Fig. 3 is a side elevation showing a modified form of the invention; Fig. 4 is a fragmental top plan of the lamp-carrying portion of the device appearing in Fig. 1, Fig. 4 applying with equal propriety to that form of the invention which is delineated in Fig. 3; Fig. 5 is a side elevation showing a modified form of the invention; Fig. 6 is a sectional elevation on the line 6—6 of Fig. 5; Fig. 7 is a top plan of a modified form of the invention; Fig. 8 is a side elevation of the structure appearing in Fig. 7; and Fig. 9 is an elevation of the standard employed in connection with Fig. 1, the view being useful to some extent, in showing the nature and construction of the standards employed in the other forms of the invention.

In the drawings, referring particularly to Fig. 1, the numeral 1 denotes the frame of a vehicle, supported upon the springs 2. The numeral 3 denotes an element which, for convenience, will be denominated the steering rod. This steering rod 3 extends transversely of the vehicle, beneath the frame. The rod 3 is operatively connected with the movable axle ends (not shown), the construction being such that when the steering rod 3 is shifted longitudinally, by the operator of the vehicle, the movable axle ends will be turned about, effecting a change in the direction in which the vehicle is moving. The steering rod 3 is a common and a well known element in an automobile structure, and a specific showing of the parts with which the rod 3 is connected, is considered unnecessary.

The invention further includes an upright standard 4, laterally extended, as shown at 5, to accommodate space conditions, it being understood that this lateral extension, shown at 5, may be disposed in any desired direction. The standard 4 at its lower end, terminates in a clamp member 6, shaped to receive the steering rod 3. Coöperating with the clamp member 6, is a cap 7, the cap 7 being held to the clamp 6 by means of bolts 8, or other securing elements adapted to a like end. At its upper end the standard 4 carries a head 9, and superposed upon the head 9, is the rear end of a forwardly projecting spring arm 10, the same being preferably inclined upwardly, the spring arm 10 being connected with the head 9 by means of bolts 11 or other securing elements, which said elements are adapted to be mounted successively in a series of holes 12, fashioned in the spring arm 10, an adjustable connection being thus provided between the standard 4 and the spring arm 10. The forward end of the spring arm 10 is upturned, as shown at 10ª, and carried forward, horizontally, to facilitate a pivotal connection between the forward end of the arm 10 and a laterally extended link 15, pivoted to the rear end of a rearwardly extended arm 16, protruding from a head 17, provided with the usual lamp-carrying forks 18. The head 17 is journaled for rotation in a boss 19, carried at the forward end of a goose neck 20, constituting a part of a cap 21, coöperating with a cap 22, to engage the frame 1, the inner edges of the caps 21 and 22 being carried toward each other, and laterally, to form flanges 23, adapted to engage within the frame 1, when the frame 1, as shown in Fig. 2, is a channel member. The caps 21 and 22 are secured together by means of a bolt 24 or the like, the bolt 24 being disposed upon the opposite side of the frame 1 from the flanges 23. The heads 17 and 17' are provided with forwardly extended arms 25, to which are pivoted stub members 26 extended toward each other, transversely of the vehicle. The head 17' is devoid of the arm 16. Into the stub members 26 is right and left hand threaded, the ends of a connecting member 27, the same preferably being a rod.

It will be seen that when the steering rod 3 is shifted longitudinally, to effect a change in the direction in which the vehicle is going, as will be readily understood, the standard 4 will move laterally, carrying with it, the spring arm 10, the arm 10, through the instrumentality of the link 15, effecting a tilting of the arm 16 and the head 17 of the lamp holder at one side of the vehicle, the lamp holder rotating in the boss 19. When this particular lamp holder which is under discussion, is rotated, the arm 25 will, through the instrumentality of the stub member 26, impart movement to the rod 27, the rod 27 obviously, as will clearly appear from Fig. 2, effecting a turning of the lamp holder at the opposite side of the vehicle. The construction, therefore, is such that although but one spring arm 10 is provided when the steering rod 3 is shifted, the lamps upon both sides of the vehicle, will be turned laterally, to follow the turn which the vehicle is then making.

It frequently happens, notably when the vehicle is passing over a rough highway, that the body of the vehicle will have a considerable amount of vertical movement, upon the springs 2. Under such circumstances, the spring arm 10 will yield, vertically, and move downwardly, thus permitting the necessary relative movement between the body of the vehicle and the steering rod 3, without causing the lamp-carrying members 18 to oscillate horizontally. Therefore, even though the vehicle be passing over a rough road, and though the body of the vehicle be subjected to a considerable degree of vertical movement, such movement in the vehicle body, will have practically no effect upon the lamps.

In that form of the invention which appears in Fig. 3, the frame is denoted by the numeral 28, the supporting spring for the frame by the numeral 29, the steering rod by the numeral 30, the standard by the numeral 31, the laterally extended portion of the standard by the numeral 32, and the clamp at the lower end of the standard, by the numeral 33. The clamp 33 coöperates with the cap 34 in engaging the steering rod 30, the members 33 and 34 being held together by the bolts 35. The standard 31 is in the present instance equipped with a rearwardly extended head 36, to which is secured a spring arm 37, the union between the spring arm 37 and the head 36 being obtained by means of bolts 28, adapted to register successively, and adjustably, in a plurality of openings 39 in the arm 37, as hereinbefore described. Adjacent its forward end, however, the arm 37 is curved upwardly and rearwardly, as shown at 40, so as to extend across the front of the laterally extended link 41, hereinbefore described, the link 41 being pivotally connected with an arm 42, projecting forwardly from a boss 43, carrying the lamp-supporting forks 44, the boss 43 being journaled for rotation in the member 45, carried by the goose neck 46 of the cap 47, the cap 47 coöperating with the cap 48 to engage the frame 28, the parts 47 and 48 preferably being held upon the frame by means of a securing bolt 49, as hereinbefore described. The member 43 is equipped with the rearwardly extended arm 45', corresponding to the arm 25 of Fig. 1, this arm 25', permitting the use of the mechanism shown in Fig. 4, whereby the lamp at one side of the vehicle, may be operatively connected with the lamp at the other side of the vehicle, so that when one lamp is turned about, the other lamp will be turned likewise.

A specific or extended description of the operation of the structure shown in Fig. 3, is not necessary, in view of what has been said hereinbefore, relative to the operation of that form of the invention which is shown in Fig. 1. It may be stated, briefly, however, that when the steering rod 30 is moved longitudinally, the standard 31 and the spring arm 37 will effect a tilting of the lamp-carrying elements 44, upon both sides of the vehicle, the spring arm 37 permitting the vertical movement of the body of the vehicle, without causing a horizontal oscillation of the lamp-carrying members 44.

Referring to that form of the invention which is shown in Fig. 5, the steering rod is denoted by the numeral 50, and the standard by the numeral 51, the standard 51 being offset, in any desired direction, as shown at 52, the standard being equipped with a clamp 53. This clamp 53 coöperates with a cap 54, in engaging the steering rod 50, the cap and the clamp being held in operative relation by means of bolts 55 or other securing elements adapted to a like end. The upper end of the standard 51 is secured to, or formed integrally with, a box-like, open head 56. Through this head 56, adjacent the rear end thereof, extends a pivot member 57. A spring arm 58 is shown, the same having at its rear end, a knuckle 59, adapted to engage the pivot element 57, so that the arm 58 may have vertical swinging movement, at its forward end. The width of the arm 58 is substantially equal to the distance between the side walls of the box-like head 56, the construction being such that, although the spring arm 58 may have vertical movement within the head 56, the head 56 may, at the same time, constitute a means for preventing the arm 58 from having lateral movement, in a plane at an angle to the vertical. Adjacent its forward end, the arm 58 is equipped with a hinge, 60, uniting the arm 58 pivotally with a finger 61. This finger 61 as will be readily understood, is adapted for connection with the link 15 or with any other equivalent element, so that the structure shown in Fig. 5 will constitute a means for turning one lamp of a vehicle about. It is to be understood that the lamp with which the structure shown in Fig. 5 is operatively connected, is, in its turn, connected, by means of the mechanism shown in Fig. 4, with the lamp at the other side of the vehicle, so that when one lamp is turned, through the instrumentality of the arm 58, the other lamp will be turned also.

In that form of the invention which is shown in Fig. 7, one wheel of the vehicle is denoted by the numeral 62, the axle being denoted by the numeral 63. The movable axle end, carrying the wheel 62, is shown at 64. Rigidly secured to the portion 64, is a link 65, pivotally connected with the transverse steering rod 56. Likewise connected rigidly with the movable axle end 64, is another link 67, disposed at an angle to the link 65. The link 67 is pivotally connected with a rod 68, extended longitudinally of the vehicle. To this rod 68 may be connected any of the structures hereinbefore described. For instance, the standard 4, appearing in Fig. 1, may be connected with the rod 68, and thus the structure shown in Fig. 1 may be operated by the rod 68, to tilt simultaneously, the lamps which are carried by opposite sides of the vehicle frame.

In the forms of the invention appearing in Figs. 5 and 7, it will be seen that the horizontal swinging movement of the lamps of the vehicle will be effected, through the instrumentality of the steering rods. Likewise, the spring arms shown, in both of the Figs. 5 and 7, will permit the body of the vehicle to have proper vertical reciprocation, upon the springs, without effecting a horizontal, pivotal movement of the lamps.

Having thus described the invention, what is claimed is:—

1. In a device of the class described, a lamp-holder; means for mounting the lamp-holder upon a vehicle for rotation; a flat resilient arm; means for securing the arm to the steering rod of a vehicle for vertical springing movement only but for movement bodily along with the steering rod in a horizontal direction; and a link pivotally connected with the forward end of the arm, and with the lamp holder.

2. In a device of the class described, the combination with the steering rod of a vehicle and a rotatably mounted, vehicle-carried lamp holder, of a standard secured to the steering rod and upstanding above the same; a spring arm connected at its rear end to the standard and having its forward end carried upwardly; and a link pivotally connecting the forward end of the arm with the lamp holder.

In testimony that I claim the foregoing as my own, I have hereto affixed my signature in the presence of two witnesses.

JAMES B. McKIEL.

Witnesses:
 JNO. B. TULLIS,
 J. C. SANDERS.

Copies of this patent may be obtained for five cents each, by addressing the "Commissioner of Patents, Washington, D. C."